(12) United States Patent
Baentsch et al.

(10) Patent No.: US 9,218,086 B2
(45) Date of Patent: Dec. 22, 2015

(54) MOBILE TOUCH-GENERATING DEVICE AS SECURE LOUPE FOR TOUCHSCREEN DEVICES

(71) Applicant: International Business Machines Corporation, Armonk, NY (US)

(72) Inventors: Michael Baentsch, Rueschlikon (CH); Thorsten Kramp, Rueschlikon (CH); Michael P. Kuyper-Hammond, Rueschlikon (CH); Thomas D. Weigold, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/667,699

(22) Filed: Nov. 2, 2012

(65) Prior Publication Data

US 2013/0120291 A1 May 16, 2013

(30) Foreign Application Priority Data

Nov. 11, 2011 (EP) .................................... 11188810

(51) Int. Cl.
G06F 3/041 (2006.01)
G06F 21/84 (2013.01)
G06F 3/044 (2006.01)
H04L 29/06 (2006.01)

(52) U.S. Cl.
CPC ............. G06F 3/0416 (2013.01); G06F 3/044 (2013.01); G06F 21/84 (2013.01); H04L 63/18 (2013.01)

(58) Field of Classification Search
CPC ....... G06F 3/0416; G06F 3/044; G06F 21/84; H04L 63/18
See application file for complete search history.

(56) References Cited

U.S. PATENT DOCUMENTS

| | | | | |
|---|---|---|---|---|
| 2008/0238879 | A1* | 10/2008 | Jaeger et al. | 345/173 |
| 2010/0125729 | A1* | 5/2010 | Baentsch et al. | 713/151 |
| 2011/0095992 | A1* | 4/2011 | Yeh | 345/173 |
| 2011/0131639 | A1 | 6/2011 | Buhler et al. | |
| 2013/0097316 | A1* | 4/2013 | Bender et al. | 709/225 |

FOREIGN PATENT DOCUMENTS

| | | |
|---|---|---|
| JP | 2005031448 A | 2/2005 |
| JP | 2006178880 A | 7/2006 |
| JP | 2008123164 A | 5/2008 |

OTHER PUBLICATIONS

Thomas Weigold, et al., "The Zurich Trusted Information Channel—An Efficient Defence Against Man-in-the-Middle and Malicious Software Attacks," P. Lipp, A.-R. Sadeghi, and K.-m. Koch (eds.): Trust 2008, LNCS 4968, pp. 75-91, 2008.

(Continued)

*Primary Examiner* — Latanya Bibbins
(74) *Attorney, Agent, or Firm* — Cantor Colburn LLP (57) ABSTRACT

A mobile touch-generating device includes logic; a touch-generating system, including one or more touch-generating elements, operatively coupled to the logic and configured to generate touch events detectable by a touchscreen, via the elements; a network connectivity device operatively coupled to the logic to establish a secure connection with a server via a telecommunication network and receive data through an established secure connection; and a visualization device connectable to the logic to display contents according to data received through the established secure connection.

21 Claims, 4 Drawing Sheets

(56) References Cited

OTHER PUBLICATIONS

Wikipedia, [online]; [retrieved on Jul. 9, 2012] retrieved from the Internet http://en.wikipedia.org/wiki/Personal_digital_assistant Wikipedia, "Personal Digital Assistant," 2012, pp. 1-9.

Wikipedia, [online]; [retrieved on Jul. 9, 2012] retrieved from the Internet http://en.wikipedia.org/wiki/Touchscreen Wikipedia, "Touchscreen," 2012, pp. 1-11.

International Search Report and Written Opinion, International Application No: PCT/IB2012/055647; International Filing Date: Oct. 17, 2012; Date of Mailing: Jan. 8, 2013, pp. 1-6.

Supplementary European Search Report; EP Application No. 12848229, Date of Mailing: Jul. 21, 2015; 4 pages.

Weigold et al., "Secure Confirmation of Sensitive Transaction Data in Modem Internet Banking Services", IEEE, Feb. 21, 2011, pp. 125-132.

* cited by examiner

MOBILE TOUCH-GENERATING DEVICE AS SECURE LOUPE FOR TOUCHSCREEN DEVICES

PRIORITY

This application claims priority to European Patent Application No. 11188810.3, filed 11 Nov. 2011, and all the benefits accruing therefrom under 35 U.S.C. §119, the contents of which in its entirety are herein incorporated by reference.

BACKGROUND

The invention relates to the field of automated communications with touchscreen devices, for example touchscreen devices using capacitive sensing.

Personal digital assistants (or PDAs) are generally known. PDAs are mobile devices offering personal information manager capabilities. Typically, a PDA has an electronic visual display (or display for short) and more generally various user interfaces.

Newer products also have audio capabilities and can be used as mobile phones ("smartphones") or portable media players. Today, almost all PDAs are smartphones. Also, most PDAs have the ability to connect to the Internet and include a web browser. In fact, many PDAs can access the Internet, intranets or extranets via Wi-Fi or Wireless Wide Area Networks.

Many PDAs use touchscreen technology. A touchscreen (or touch-sensitive display) is an electronic display sensing the location of a touch event within the display area. Usually, touching the display is done with a finger. Touchscreens can also sense passive objects such as a stylus. Touchscreens are typically used in devices such as all-in-one computers, tablet computers, PDAs and smartphones. There are a variety of touchscreen technologies, e.g., resistive, capacitive, infrared, etc.

Capacitive sensing is perhaps the most used technology for PDAs. A capacitive touchscreen panel comprises an insulator such as glass, coated with a transparent conductor, e.g., indium tin oxide. Touching the surface of the screen with a conductor (the human body is also an electrical conductor) results in a distortion of the electrostatic field of the screen, which can be measured as a change in capacitance.

Security problems with PDAs (just like PCs) make them unsuitable for many functions since data entered by users can be manipulated or copied by an attacker. For example, transactions can be changed to send money to unwanted recipients or to order unwanted goods, or user credentials can be copied providing attackers with access to systems such as those used for Internet banking. Beyond PDAs, touch-sensitive displays become increasingly prevalent in many electronic devices ranging from smartphones, tablet PCs or laptops to special purpose devices such as ATM machines, the displays acting as human interface devices.

Such general-purpose devices tend to be online and are used to access data online on the go. Based on the data gathered, decisions are made. It is therefore highly desired that the data displayed is genuine, e.g., has not been tampered with by some virus or Trojan software. Yet, given that such devices computers are often freely programmable, it is usually not possible to prevent users downloading applications from untrusted sources. This may introduce malicious software altering the touchscreen devices operation to the extent that their display may actually not show genuine data, but data that has been tampered with on the touchscreen device. In order to prevent this kind of attack, which is quite common on PCs already, a secured network connection between the touchscreen device and data-providing server is not sufficient as the manipulation can be carried out locally by means of malicious software running on the touchscreen device.

For online transactions, for example, a solution which has been developed is the so-called Zone Trusted Information Channel (or ZTIC for short). The ZTIC is a secure, non-programmable device for the authentication of transaction data. Since the ZTIC maintains a secured end-to-end network connection to the server, the ZTIC itself is tamper-proof against malicious software attacks and as it has its own input and output components independent of the host it connects to, the data shown on the ZTIC display is genuine. More details can be found in e.g., "The Zurich Trusted Information Channel—An Efficient Defence against Man-in-the-Middle and Malicious Software Attacks", by Thomas Weigold, Thorsten Kramp, Reto Hermann, Frank Wiring, Peter Buhler, Michael Baentsch. In P. Lipp, A.-R. Sadeghi, and K.-M. Koch (Eds.): TRUST 2008, LNCS 4968, pp. 75-91, 2008. Springer-Verlag Berlin Heidelberg 2008.

The ZTIC security concept usually depends on the identification of a reasonably small subset of the data visible on the touchscreen device, e.g., transaction data in the case of online banking. Typically, the server prescribes which data is considered critical (and accordingly requires explicit off-host verification) and which data is not critical. For web services in general, for example, this scheme may not be the most practical as it is not always possible to define a reasonably small subset of critical data or to detect crucial information for explicit confirmation automatically. In particular, this scheme is not practical for web sites.

SUMMARY

In one embodiment, a mobile touch-generating device includes logic; a touch-generating system, including one or more touch-generating elements, operatively coupled to the logic and configured to generate touch events detectable by a touchscreen, via the elements; a network connectivity device operatively coupled to the logic to establish a secure connection with a server via a telecommunication network and receive data through an established secure connection; and a visualization device connectable to the logic to display contents according to data received through the established secure connection.

In another embodiment, a method of communication between a mobile touch-generating device, a touchscreen and a server includes generating one or more touch events via the mobile touch-generating device, the mobile touch-generating device includes: logic, a touch-generating system comprising one or more touch-generating elements, operatively coupled to the logic and configured to generate touch events detectable by a touchscreen, via the elements, a network connectivity device operatively coupled to the logic to establish a secure connection with a server via a telecommunication network and receive data through an established secure connection, and a visualization device connectable to the logic to display contents according to data received through the established secure connection; detecting the generated touch events at the touchscreen and sending data of touch events via the telecommunication network; receiving at the server the data of touch events or related data; sending contents selected in accordance with the received data through a secure connection established with the mobile touch-generating device; and receiving the contents at the mobile touch-generating device and displaying them via the visualization device.

In another embodiment, a computer program product includes a computer readable storage medium having instructions stored thereon that, when executed by a computer, implemented a method of communication between a mobile touch-generating device, a touchscreen and a server. The method includes generating one or more touch events via the mobile touch-generating device, the mobile touch-generating device including: logic, a touch-generating system comprising one or more touch-generating elements, operatively coupled to the logic and configured to generate touch events detectable by a touchscreen, via the elements, a network connectivity device operatively coupled to the logic to establish a secure connection with a server via a telecommunication network and receive data through an established secure connection, and a visualization device connectable to the logic to display contents according to data received through the established secure connection; detecting the generated touch events at the touchscreen and sending data of touch events via the telecommunication network; receiving at the server the data of touch events or related data; sending contents selected in accordance with the received data through a secure connection established with the mobile touch-generating device; and receiving the contents at the mobile touch-generating device and displaying them via the visualization device.

BRIEF DESCRIPTION OF SEVERAL VIEWS OF THE DRAWINGS

FIG. 5 is a partial projection of a (lower) part of a variant of a touch-generating system, involving nine touch generating elements, and as it looks from: the bottom (FIG. 5A) and the side (FIG. 5B).

DETAILED DESCRIPTION

According to a first aspect thereof, the present embodiments a mobile touch-generating device having: a logic; a touch-generating system, comprising one or more touch-generating elements, and coupled to the logic to generate touch events detectable by a separate touchscreen, via the elements; and network connectivity device operatively coupled to the logic to establish a secure connection with a server via a telecommunication network and receive data through a secure connection accordingly established; visualization device connectable to the logic to display contents according to data received through the established secure connection.

In embodiments, this device may comprise one or more of the following features: the touch-generating system comprises at least three touch-generating elements, and preferably nine touch-generating elements; the one or more touch-generating elements comprise respective conductive electrodes and the touch-generating system further comprises a circuitry coupled to the logic and connected to the electrodes via one or more switches, allowing for closing the circuitry and draining electrical charge from the electrodes; the network connectivity device are coupled to establish the secure connection with the server by using a network connection enabled by a neighboring device, preferably by tethering over such a connection; and the mobile touch-generating device is furthermore configured such that the mobile touch-generating device can rest on the touchscreen, with the touch-generating elements in close proximity with the separate touchscreen According to another aspect, the invention is embodied as a system comprising: the mobile touch-generating device according to any one of the above embodiments, wherein the touch-generating system of the mobile touch-generating device is configured to generate touch events; and a touchscreen capable of detecting such touch events, the touchscreen further configured to establish a connection to the telecommunication network, whereby data of touch events detected at the touchscreen can be received at the server.

The mobile touch-generating device may be configured such that the mobile touch-generating device can rest on the touchscreen, with the touch-generating elements in close proximity with the touchscreen, and spanning an area smaller than a surface of the touchscreen.

Furthermore, the system may further comprise the server, wherein the server is configured to: receive data of touch events detected at the touchscreen; and select contents in accordance with the received data and send the selected contents through a secure connection established with the mobile touch-generating device for subsequent display at or via the mobile touch-generating device.

According to a further aspect, the invention is embodied as a method of communication between the mobile touch-generating device according to embodiments of the invention, a touchscreen and a server, the method comprising: generating one or more touch events via the mobile touch-generating device; detecting the generated touch events at the touchscreen and sending data of touch events via the telecommunication network; receiving at the server the data of touch events or related data; sending contents selected in accordance with the received data through a secure connection established with the mobile touch-generating device; and receiving the contents at the mobile touch-generating device and displaying them via the visualization device.

In embodiments, this method may comprise one or more of the following features: the touch events are detected via an application running on the touchscreen; the touch events are detected by computer program code such as JavaScript code, the computer program code implemented as part of the running application that preferably is a browser displaying a web page through the touchscreen; the data of touch events comprise information as to a location of the mobile touch-generating device or the one or more touch-generating elements having generated the touch events, preferably relative to contents displayed via the touchscreen when detecting the touch events; the secure connection is established via the network connectivity device, using one of the following: a network connection enabled by a neighboring device, preferably by tethering over such a network connection; or a separate network connection; the method according to the embodiments of the invention further comprises a step of receiving configuration data pertaining to a configuration of the mobile touch-generating device, the configuration data preferably indicating an arrangement of the one or more touch-generating elements, and wherein receiving configuration data preferably comprises: receiving via the touchscreen a sequence of touch events generated by the mobile touch-generating device; and determining the configuration according to the sequence received.

According to a final aspect, the invention is embodied as a computer program medium comprising instructions executable by processing device for executing all the steps of the method according to embodiments of the invention, preferably within a web application.

Methods, devices and systems embodying the present invention will now be described, by way of non-limiting examples, and in reference to the accompanying drawings.

Introduction

As an introduction to the detailed description, it is first noted that a general aspect of the disclosure is directed to a mobile touch-generating device (hereafter "TGD"), i.e., a user device comprising a touch-generating system. This system is equipped with one or more touch-generating elements (hereafter "TGEs") and is operatively coupled to logic to generate touch events via the TGEs. These events are detectable by a touchscreen device. The TGD is further equipped with a network connectivity device, operatively coupled to the logic to establish (or trigger) a secure connection with a server, e.g., some pre-defined or user-configurable remote server, via a telecommunication network. Finally, the TGD comprises a visualization mechanism operatively coupled (or at least connectable) to the logic to display contents according to e.g., data received through the established secure connection.

Such a TGD primarily allows for securely accessing contents in accordance with touch events sensed on the touchscreen. Many applications can be contemplated, notably the verification of contents displayed by a paired touchscreen device. For instance, touch events can be generated at a given location of the touchscreen device, e.g., where some particular contents are displayed to the user. Data related to the touch events detected at the touchscreen can thus be sent by the touchscreen over the network and subsequently passed to the server. The latter can in turn select genuine contents in accordance with the received data and send the selected contents through a secure connection established with the TGD. The selected contents, i.e., a priori genuine data, can finally be displayed via the TGD, such that the user can check the contents displayed by the touchscreen. The user can further move the TGD on the surface of the touchscreen and check any displayed data. The TGD can therefore be regarded as a verification tool, at least in some applications. Data displayed via the TGD may be magnified, if necessary, whereby the TGD is accordingly called a "secure loupe" in some practical embodiments.

Description of Devices and Systems

Touch-Generating System vs. Touchscreen

Figure 2:
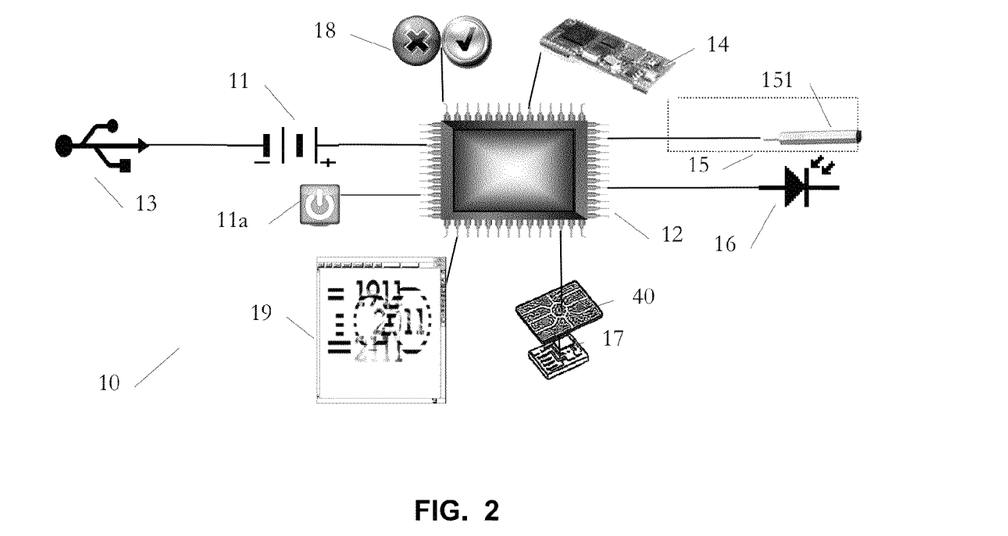
FIG. 2 is a schematic representation of a touchscreen device and its components, according to embodiments.
Figure 4:
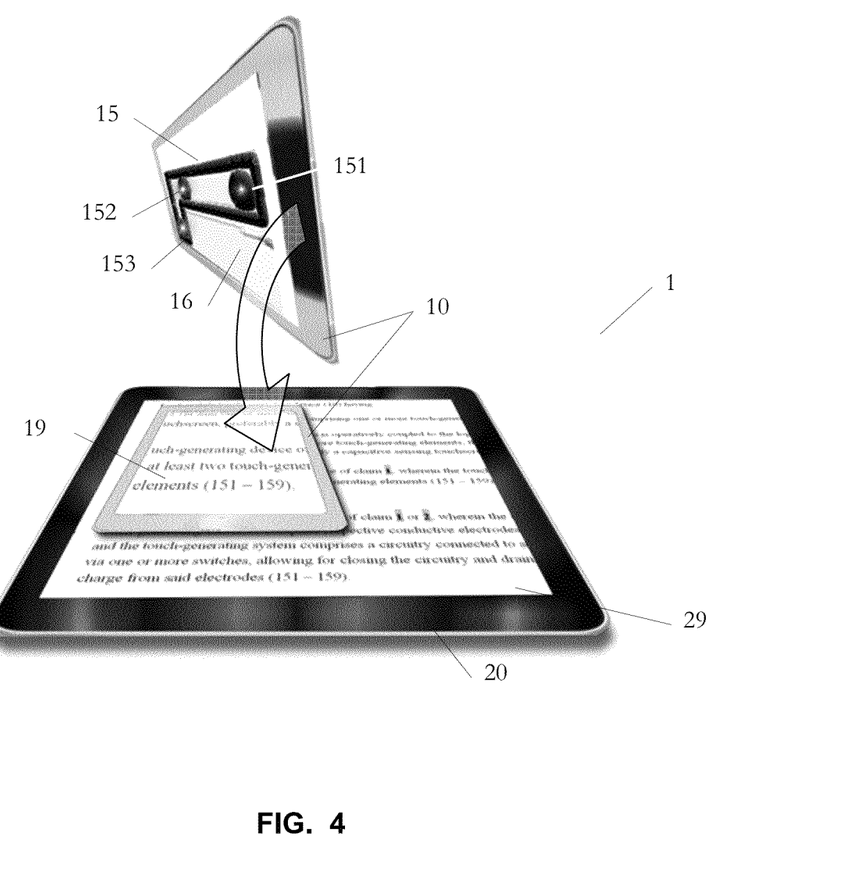
FIG. 4 is a schematic representation of a mobile touch-generating device paired to a touchscreen, according to embodiments.

Referring in particular to FIG. 2 or 4, the touch-generating system 15 is suitably coupled to logic 12; it comprises one or more TGEs 151-153 for generating touch events to be detected at a touchscreen device 20.

An exemplary technology for the touchscreen device 20 is capacitive sensing. Relying on capacitive sensing is advantageous inasmuch as the TGD does not need to include moving parts (i.e., actuated TGEs), which are otherwise typically required with other technologies. Rather, by using capacitive sensing, a TGE may merely employ a conductive electrode 151.

The touch-generating system 15 may thus essentially comprise a circuitry, e.g., a resistor-capacitor circuit 150 (see FIG. 3) connected to the electrode 151 via an electronic switch. Closing the circuit allows electrical charge to drain from the electrode into the additional capacitance, resulting in a change in capacitance, i.e., a (capacitive) touch event. The circuitry and electrode are for example designed such as to implement a suitable human body capacitive model, together with highly isolating transistors, which ensures compatibility with most capacitive touch screen technologies. This shall be discussed later in further detail.

The TGE might, however, work differently in case of other touch display technologies, for instance, via mechanical pressure. Here, actuated fingers (i.e., mechanically operated pressure points) might be used in place of switched electrodes, together with electric motors or piezoelectric elements as a primary mechanism for creating a mechanical force on the fingers.

Touch-Generating Elements

The touch-generating system 15 comprises at least one TGE 151. However, increasing the number of TGEs allows for increasing the communication bandwidth with the touchscreen device 20. Also, increased TGEs make it possible to increase arbitrariness in the placement of the TGD on the touchscreen. Physical or visual mechanisms may also be provided to constrain the position of the TGD (e.g., a calibrated placement) on the touchscreen, as to be discussed later. However, a single TGE is in principle enough to permit communication with the touchscreen device.

In one embodiment, the touch-generating system 15 comprises at least two TGEs 151-152, which already allows arbitrariness in the positioning of the touch-generating device, e.g., provided that the touchscreen device or an application running thereon knows about the configuration of the mobile touch-generating device. Note that the configuration may be (at least partly) known beforehand or be otherwise available, e.g., from the Internet. It can also be communicated directly by the TGD, via a touch-event sequence, as to be discussed later.

As depicted in FIG. 4, at least three TGEs 151-153 are provided, e.g., in an asymmetrical configuration (not forming an equilateral triangle), whereby even more arbitrariness is allowed in the position of the TGD. More specifically, nine elements 151-159 are provided, to increase communication bandwidth, as depicted in the example of FIG. 5.

In any case, the mechanism by which the touch events generated by the one or more TGEs relate to contents displayed via the touchscreen (geometrical relationships) can be deduced, if necessary, by an application running on the touchscreen device such as a web application.

As illustrated in FIG. 4, the TGEs 151-153, the touch-generating system 15 and more generally the TGD 10 are configured such that the TGD can be laid on the display 29 of the touchscreen 20, with the touch-generating elements 151-153 resting in close proximity with the touchscreen display 29. Also, the TGEs may be arranged in a plane spanning an area smaller than a surface of a typical touchscreen, e.g., smaller than a PDA display, such that the touchscreen can sense touch events generated by each of the TGEs. In addition, and especially if bidirectional communication is desired, the effective surface spanned by the TGEs plus the photodetector 16 may be designed such as to fit within the display surface of most typical touchscreen device.

Figure 5A:
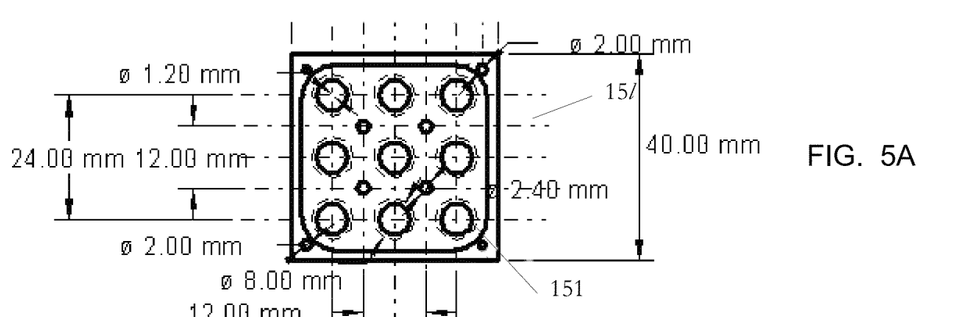
Figure 5B:
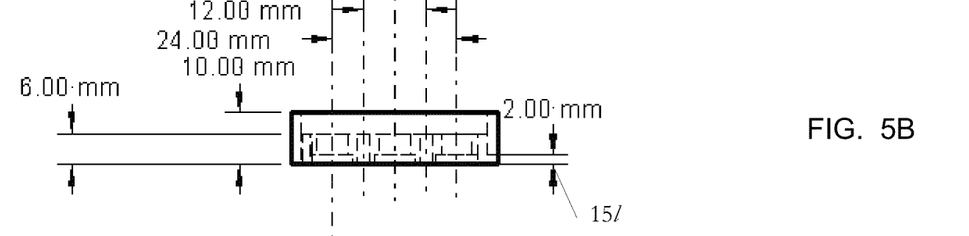
Figure 5C:
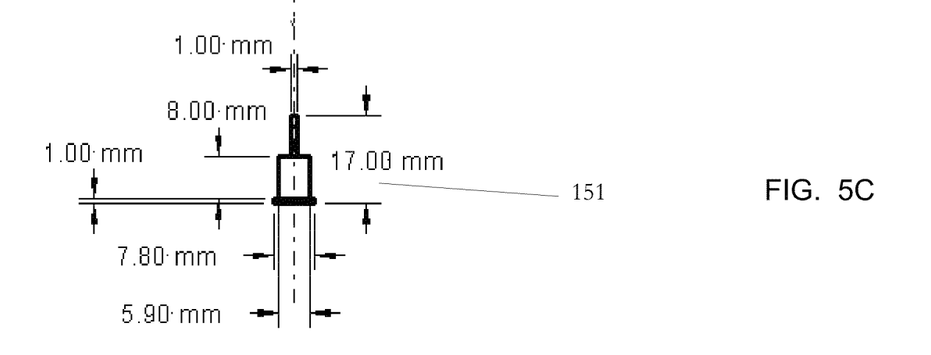
FIG. 5C focuses on a given touch-generating element (conductive electrode), as involved in various embodiments.

In the example of FIG. 5, each TGE essentially comprises a conductive electrode (FIG. 5C), i.e., a finger inserted and fixed or hold in a corresponding recess of a body (FIG. 5A, bottom view, FIG. 5B, side view). The dimensions provided in this example are compatible with various panel dimensions of smartphone/PDAs' touchscreen. For example, here, the main diameter of a conductive electrode is 5.90 mm, the maximal diameter being 7.80 mm. The touch-generating panel fills a 40.00×40.00 mm area (FIG. 5A). FIG. 5A shows a panel that can host nine electrodes and four photodetectors. The photodetectors can for instance be mounted behind the four small holes located around the electrode in the center of the panel. Such dimensions can obviously be adapted, depending on the type and performances of touchscreen devices and the number of TGEs contemplated. If resolution permits, the maximal diameter of the TGEs can be substantially lowered, e.g., to 1 mm or below.

As indicated previously, if a touchscreen technology is used that requires mechanical pressure for generating touch events, mechanically movable fingers connected to electronic actuators can be inserted instead of the conductive electrodes in order to generate pressure when requested by the logic.

Detailed Description of the Touch-Generating Circuit

Figure 3:
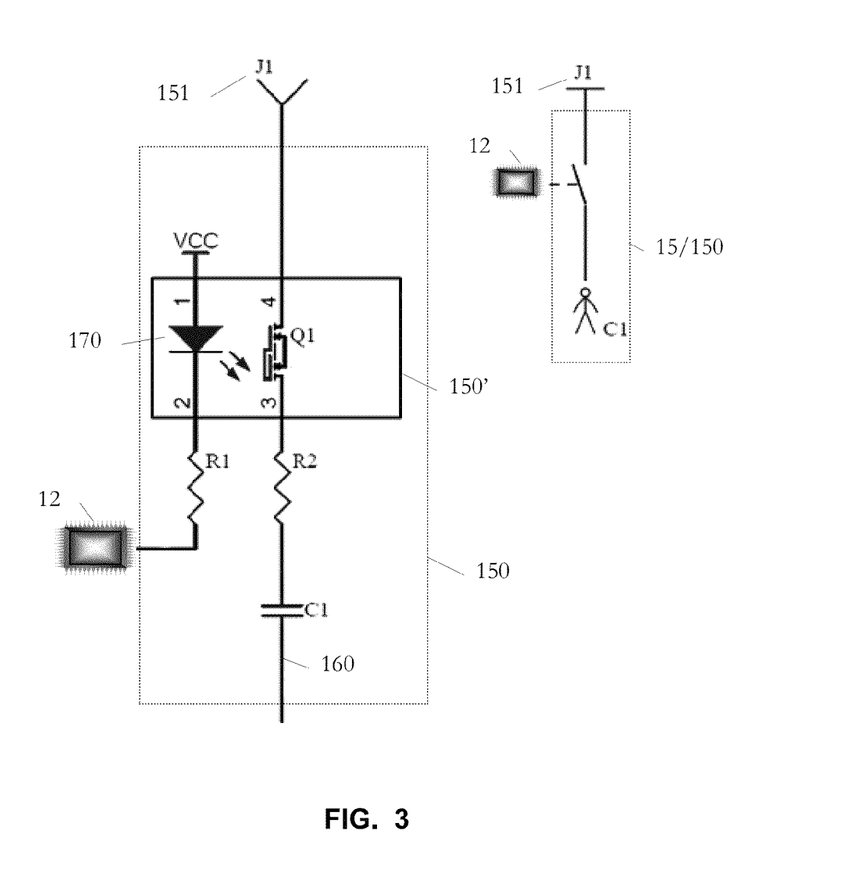
FIG. 3 represents a part of a circuitry connected to a touch-generating element (a conductive electrode), as involved in embodiments.

At present, details shall be given as to a possible embodiment for a touch-generating circuit, in reference to FIG. 3. As stated above, the mobile TGD comprises a touch-generating system 15 with TGEs 151-153. A TGE essentially comprises a conductive electrode 151. The touch-generating system may furthermore essentially comprise a circuitry 150. Circuit 150 connects logic 12 to the TGEs, such that electrical charge can be drained from an electrode when closing the relevant portion of the circuit pertaining to that electrode, in order to create a (capacitive) touch event.

In further detail with respect to FIG. 3, J1 represents an electrode 151, i.e., the TGE at the bottom of the TGD, meant to be placed at or close to a capacitive touch sensitive display. The optically coupled MOSFET (metal-oxide-semiconductor field-effect transistor) 150' used in this example can be considered as a switch between connections 3 and 4 that opens and closes depending on light emitted by the light emitting diode 170 between connections 1 and 2. In other words, it can be regarded as a switch that is switched on or off by light. Here an optical MOSFET is used because it has a very small input capacitance, which means its capacitance at connector 4 is very low if the switch is open. However, one could use any suitable device such as e.g., a mechanical solid state relay instead (although the latter might be less practical than an optical MOSFET since it is likely larger). Note that some types of (non-optical) transistors typically have a much higher input capacitance, meaning that the touch sensitive display would always detect a touch event independently of whether the switch is open or closed. In other words, an appropriate switch mechanism is tailored to its intended function, i.e., to generate touch events via a TGE, which events are detectable by a (typical) touchscreen.

In the example of FIG. 3, the resistor R2 and the capacitor C1 together represent a "human body model", compatible with touch event detection at the touchscreen device. In other words, they are chosen such as to mimic the resistance and capacitance of a human body. The connection 160 is connected to ground. If the switch between 3 and 4 is closed, ground is connected via the human body model to the electrode 151 and the touchscreen detects a touch event (as if a person would touch the screen) as it detects a change in capacitance. The core of the logic 12 triggering the touch events is connected via R1 and pulls this line to ground whenever a touch is to be generated. The core of the logic 12 may for instance be designed partly or wholly in software executing in a microprocessor connected via R1 to the electrode 151, as otherwise depicted in FIG. 2 or 4, in a very simplified version. Yet, in FIG. 2 or 4, the details of circuit 150 are not represented. The light emitting diode 170 is then switched on by the logic core when appropriate and the switch between 3 and 4 is closed. The resistor R1 is provided to prevent short circuit when operating the light emitting diode 170.

A very simple schematic version of the circuit is represented as an inset figure, wherein logic core 12 is shown to actuate a switch. Circuit 150 can be regarded as a switch, connecting the human body model to electrode 151 and actuated by logic core 12. Upon closing the circuit: electrical charge is drained from electrode 151, resulting in the desired capacitive touch event. The latter is accordingly detected at the touchscreen device.

Typical values for R1, R2 are 750 and 1500 Ohms. A typical value for the capacitance C1 is 100 picofarads (pF). Such values can be adapted depending on the application, the exact characteristics of the electrodes and the touchscreen compatibility contemplated, etc. It will be appreciated that the exemplary circuit of FIG. 3 is simplified for ease of description, and that one skilled in the art will recognize that the principles illustrated in FIG. 3 can be parallelized to several electrodes, if needed. Of course other circuits could be designed that perform essentially the same functions. Finally, instead of a conductive electrode connected via a switch to the human body model, any other means that suitably influences the electric field and thus the capacitance measured by the touchscreen may be used.

Network Connectivity

Figure 6:
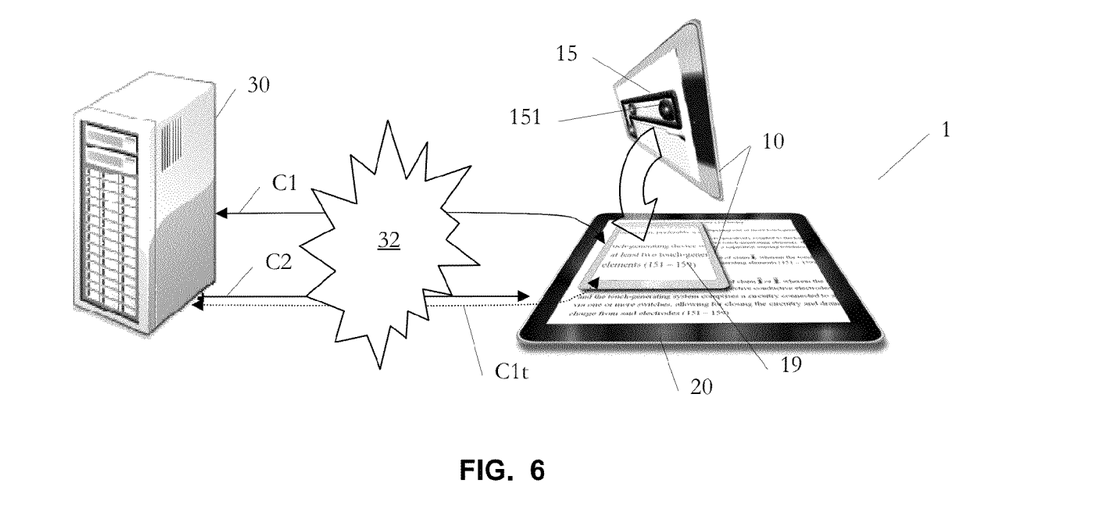
FIG. 6 is a schematic representation of a system comprising a server, the latter communicating with a mobile touch-generating device resting on a touchscreen and used as a secure loupe to check contents displayed by the touchscreen, according to embodiments.

Also, referring back to FIG. 2 or 4, the TGD 10 is further equipped with network connectivity means 14, operatively coupled to the logic 12 to enable secure connection with a remote server, i.e., via a network 32. As illustrated in FIG. 6, such network connectivity means allows for enabling a secure connection C1, C1t with server 30.

Two types of connections can notably be contemplated: a separate connection (enabled and maintained by connectivity device 14 independently from the touchscreen 20) or a shared connection.

Most practically, the network connectivity device 14 may share a connection, i.e., use a network connection as enabled by a neighboring device, e.g., by tethering over a (typically wireless) connection enabled by the touchscreen device or, in fact, any neighboring device that allows to do so. Shared connections are generally known per se. In the present case, it suffices to suitably connect device 14, e.g., a connectivity package, to the logic 12. Additional device configuration steps may further be utilized, e.g., by the touchscreen or any neighboring device and possibly by the TGD as well, in order to authorize the shared connection, as known in the art.

For example, techniques are generally known which allow for sharing an Internet connection of an Internet-capable PDA such as a mobile phone with other devices. Such a sharing can be provided over a wireless LAN (WiFi) or over Bluetooth or, still, by physically connecting the device. To that aim, the TGD may be provided with USB capability 13, although wireless connection (e.g., tethering over wireless LAN) is preferred, for ergonomical reasons. For example, the Internet-connected touchscreen 20 would act as a portable router when providing tethering services to the TGD 10. Thus, in the present case, the TGD may share a connection with a neighboring device, wirelessly or not. As a result, a secure connection C1t can be established with server 30, e.g., over a network connection enabled by the touchscreen device 20.

In an embodiment the connectivity device 14 may maintain its own network access (e.g., GPRS, WLAN), as known per se. In this case, a secure connection C1 can be established with server 30 as well, yet independently from the touchscreen device 20.

Visualization Device

Finally, the TGD comprises visualization device 19, i.e., a display 19 or electronic goggles, coupled (or at least connectable) to the logic 12. As to be discussed in further detail below, this may allow for displaying contents received through the secure connection established with the server, to be able to thereby inspect securely accessed data.

Bidirectional Communication Between Touch Generating Device and Touchscreen

As depicted in FIGS. 2 and 4, the TGD may further comprise, in embodiments, a detector system 16 (e.g., with light sensitive elements such as photosensitive diodes), to allow for bidirectional communication with the touchscreen device. This can be useful for some applications, in addition to the main applications contemplated herein. To that aim, a photodetector system 16 can be coupled to the logic 12 to read and/or decrypt optical signal displayed at the touchscreen display 29.

Typically, the logic 12 may instruct to generate touch events in response to optical signal detected via the photodetector 16. Implementation of light-sensitive components is possible with standard electronics components (e.g., light-sensitive resistors or diodes).

The touchscreen device may be configured to display an image modulated in space and/or in time (e.g., flickering image). Flickering images are advantageous since they allow for designing or reusing communication protocols embedding arbitrary binary information in light signals, e.g., flickering bright (1), dark (0). For example, images may consist of a flickering 1D bar code in black/white, gray scale or color, where one bar defines the clock and the others represent data bits that are transferred per clock signal. An alternative would be the single image of a 2D barcode.

In turn, the mobile TGD, equipped with the photodetector system 16 coupled to the logic 12, can detect the displayed images. The TGD is placed reasonably close to or in contact with the touch-sensitive display of the touchscreen device such that elements (e.g., photosensitive diodes) of the photodetector can easily read the bars of the flickering image or the barcode.

Also, the logic 12 may generate touch events in response to the image detected. More generally, the touchscreen 20 may comprise an interface device beyond the touchscreen, enabling communication towards the TGD. Beyond displayed images, other types of signals can be contemplated, e.g., audio, wireless, etc., which may also be envisioned to ensure bidirectional communication.

Advantageously, the function of displaying an image is more easily designed within the same application (e.g., a web application) that can otherwise sense the touch events generated by the TGD. In addition, the same application may enable communication to a remote server, e.g., via wireless Internet access.

Additional Components of the Touch-Generating Device

The logic 12 may include a processing device (or computing device) coupled to a memory, which may include both volatile and nonvolatile memories. The nonvolatile memory may store e.g., computerized methods as discussed below, which methods are executed by the respective processing device. The same applies for the touchscreen device. Logic 12 as depicted in FIG. 2 triggers touch events, connections to the server, is notified of data reception and subsequently instructs to display the received data. However, other architecture could be relied upon, wherein decisions re made by different entities instead of a central logic.

Referring to FIG. 2, the TGD 10 can be provided with at least one interface 13, e.g., a USB interface, for charging a battery 11 of the device and/or communicating with any other USB compatible device, if needed. The device 10 may further be provided with a card reader 17 to read user credentials stored on a memory card 40, e.g., a smart card. Suitable use can safely be made out of such data, e.g., user credentials as stored on the card. In particular, a trustworthy connection can be established between a user (or strictly speaking the TGD 10) and a third party, e.g., a server such as server 30 shown in FIG. 6, possibly via the touchscreen device 20, which trustworthy connection may require using such data. In a variant, the user credentials may be stored directly on the persistent memory of the secure device. In that respect, one may design or reuse any suitable cryptographic protocol to encode/decode the security-sensitive information to be displayed and signed by the device.

Further interfaces (like control buttons 18) may be provided to allow for direct interaction with the user. Also, the device typically comprises an on-off switch 11a.

In alternate embodiments, the device 10 may further be provided with one or more solar cells to charge a battery (not shown) or directly power the touch-generating system 15, taking advantage of light received e.g., during bidirectional communication between the TGD 10 and the touchscreen device 20. The TGD depicted in FIG. 4 may otherwise include other functionalities similar to those of FIG. 2, i.e., control buttons, on-off switch, battery, etc. (not shown).

Communication Methods

Basic operation of touch generating device and touchscreen

Basically, as illustrated in FIG. 4 or 6, a mobile TGD such as described above may generate touch events via the touch-generating system 15 and respective TGEs 151-153. The paired touchscreen device 20 is generally capable of detecting such events. In addition, the touchscreen 20 is further configured to establish a connection (e.g., C2 in FIG. 6) to the network 32, e.g., to a same server that is otherwise reachable by the TGD 10. Generally, data of touch events detected at the touchscreen 20 (or any sort of related data) can obtained by or passed to the server 32.

Turning to FIG. 6, the server may access data of touch events detected thanks to the touchscreen 20 (or related data). Next, the server may select contents in accordance with the received data and send selected contents through a secure connection C1, C1t established with the TGD 10 for subsequent display at the device 10.

Communication Between Touch Generating Device, Touchscreen and Server

Figure 1:
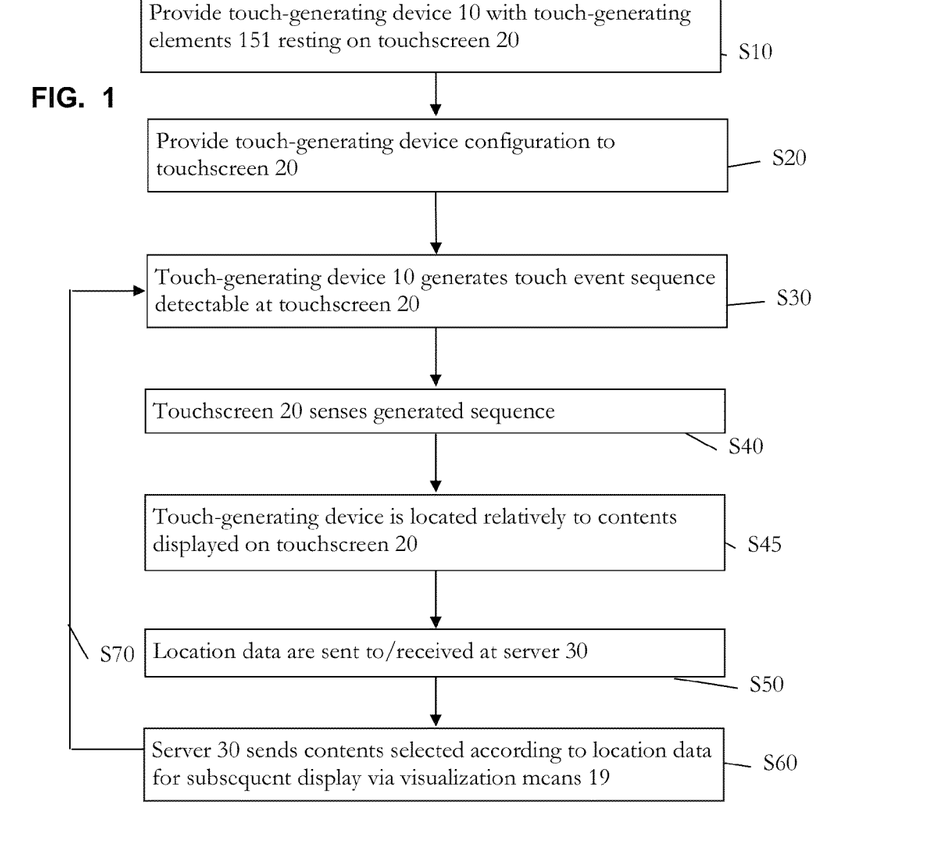
FIG. 1 is a flowchart depicting steps of a method according to exemplary embodiments.

Exemplary operations for a system such as depicted in FIG. 6 are captured in the flowchart of FIG. 1:

Block S10: initially, a user typically powers the TGD 10 on and puts it on the touchscreen, such that TGEs 151-153 rest on touchscreen 20, as otherwise illustrated in FIG. 4;

Block S20: If necessary, configuration data are provided to the touchscreen, at any time before blocks S40-S45 below. Such data capture the arrangement of the TGEs. The configuration data may for instance be provided by the TGD itself, e.g., via a sequence of touch events generated by the mobile device 10, which can then be sensed and interpreted via the touchscreen device 20. At the same time, the TGD 10 may seek to establish a secure connection (e.g., SSL-protected) to some pre-defined or user-configurable server, either by using its own network connection or one provided by the touchscreen.

Block S30: one or more touch events are generated by the TGD;

Block S40-S45: the touch events are sensed at the touchscreen device and the TGD is located, e.g., with respect to a position "in display". However, in principle, the minimal amount of information needed at this point is a touch event, since some simple application might not even need to locate the TGD within a "document" or any contents displayed to the user. Locating the TGD is nevertheless mostly required, which is typically done in the same way as touch events are usually correlated to contents "in display" within touchscreen applications.

Here too, the touch events are typically detected via an application running on the touchscreen device.

Touch events may be detected by suitable computer program code such as JavaScript code implemented as part of the running application, e.g., a browser displaying a web page through the touchscreen. Thus, a preferred example of application is that of a touchscreen running a web application, which displays contents of a web page maintained by the server 30 or otherwise known from the server. JavaScript code may suitably recognize the touch events generated.

Alternatively, contents are presented to the user by a specific application running on the touchscreen, which again is suited for recognizing the generated touch events and their locations, if necessary.

The touch events sensed may be located relatively to specific contents displayed on the touchscreen or some reference location in the displayed data (block S45).

The JavaScript code or application may further continuously send to the server the data related to the location of the TGD/touch events.

For most applications contemplated herein so far, we assumed that the server is able to retrieve what data/contents the touchscreen is assumed to genuinely show at the location of the TGD, in a way or another.

This can simply be achieved when relying on a web application, whereby the server may easily have access to the relevant contents/data.

In alternative embodiments, additional exchanges between the server and touchscreen or the server and TGD may be needed, such that the server is able to identify which data are relevant.

In other applications, the application running on the touchscreen is not necessarily aware of the contents corresponding to the TGD location chosen by the user (e.g., hidden contents). By moving the TGD to such locations, the user is able to reveal contents which are logically associated to such locations. In this case, the server is aware of a location vs. contents mapping, or can somehow deduce the relevant contents according to the TGD location such that the relevant contents can be passed to the TGD via the secure connection C1, C1t. In such applications, the TGD can be used to securely complete contents as displayed by the touchscreen. Other variants are mentioned below. Again, considering the various possible applications of the present invention, the minimal amount of information that the server 30 must be aware of is an occurrence of a touch-event in a certain context (time, type of application running on the touchscreen, webpage visited, etc.), which it can reply to by securely communicating data/contents (logically related to the touch-event and context) to the TGD for subsequent display. Note that contextual data may be required or not as in some cases the context is implicit. In other cases, only contextual data may be passed to the server 32;

Block S50: data related to the detected touch events are sent over network 32, e.g., directly to the server 30 through a connection C2 previously established therewith. As described above, data of touch-events may include information as to the context (contextual data), beyond information informing about the occurrence of a touch-event. In fact, data of touch-events may even restrict to contextual data, such as information as to a location of the TGD within a document. This can be an absolute location (e.g., corresponding to the nth character in a text file or a nth entry in a database, etc.) or a relative position of the touch with respect to some reference position or content, etc.;

Block S60: the server 30 then proceeds to identify and select the relevant contents, i.e., the contents corresponding to the data of touch-events it has received or had access to. For example, the relevant contents may be all contents corresponding to the identified location, or within a given distance from the identified location. One identified, the relevant contents are selected. The identified contents may be stored on the server or be accessible by the server. To summarize, relevant contents are selected by the server in accordance with the received data. Then, the selected contents are sent through the secure connection C1, C1t established with the mobile touch-generating device.

As stated, the secure connection C1, C1t is established via the network connectivity device 14 of the TGD 10, using its own network connection or a connection enabled by a neighboring device, e.g., by tethering C1t over such a connection. The necessary connection C1, C1t is assumed to be already established at this point (it may have been established at any suitable time before block S50). Note that it may be automatically triggered, e.g., upon connecting the TGD 10, or putting the TGD on the touchscreen 20, or upon request by the TGD 10 to share an Internet connection. Connection C1 or C1t is a secure connection (e.g., SSL-protected): since data are securely transmitted (typically end-to-end encrypted between the server and TGD), the touchscreen device cannot read or tamper with information exchanged even if providing the network connection.

Finally, the selected contents as sent from the server 30 to the TGD 10 can be displayed via the visualization device 19, as illustrated in FIG. 4.

As one possible application, different parts of a document displayed on the touchscreen 20 can be verified by moving the TGD to a desired location on the touchscreen. Thus, any malicious software running on the touchscreen and altering its screen contents will be exposed as the screen contents of the TGD shall differ from those of the touchscreen. This comparison can be even done automatically either on the server (if the TGD sends the information read back to the server) or on the TGD itself.

Since the connection between the server and the TGD is protected from being tampered with by any software running on the touchscreen, the end user can verify that the data shown on the touchscreen display is indeed genuine whereby, typically, the user is expected to verify only small portions of her/his choice of all the data, for example the areas of most significance to her/him.

Variants

Several application variants can be contemplated. One is to prevent others from "eavesdropping" on data displayed on the touchscreen, e.g., by looking over the user's shoulder. In this case, the data are not shown on the touchscreen at all (the touchscreen may not even know the hidden data). Rather, white spaces with some markings are shown that still allow the user to navigate on the document. The data are then only displayed on the TGD. In this case it might be preferable to connect e.g., electronic goggles to the TGD (instead of display 19) for the user to wear while scanning through the data by moving the TGD on the touchscreen. Other visualization device 19 can be contemplated, which at least are connectable to the TGD (and thus to the logic 12 thereof).

The TGD may additionally provide a mechanism to authenticate, e.g. by generating a digital signature, the data shown at a specific point in time (or that has been showing over some time while moving the TGD over the touchscreen) and send an authentication message back to the server. This mechanism may be automatically triggered as the TGD is used or it may require a specific user action, e.g., a button press, to be activated.

The TGD may further implement caching strategies to prevent loading the same data multiple times while being moved over the GDP's display. Additional communication between the TGD and the server might be necessary to efficiently implement such caching strategies.

Depending on the screen resolution of the TGD's display 19, the TGD may or may not be magnifying or de-magnifying. In the examples of FIG. 4 or 6, the TGD magnifies the contents displayed, whence the nickname of "secure loupe".

A further variant may additionally show data areas of particular significance to the server's logic on the TGD's display whether or not the user selected them for review in the TGD.

The above concepts may be extended beyond touchscreen devices into application-specific appliances like automated teller machines (ATMs) of banks: By holding the secure loupe to the display of the ATM, the TGD may provide a guarantee that the display of the ATM has not been tampered with. Additionally, the TGEs of the TGD may key in confidential information like PIN codes invisibly to any malicious observer.

Bidirectional Communication Between Touch Generating Device and Touchscreen

Next, typical steps of a method of bidirectional communication between the mobile device 10 and the touchscreen device 20 shall be discussed, for completeness.

Two main operations include:

Block S50': the touchscreen device (e.g., a web application thereof) instructs to emit a signal (e.g., an image) via some interface device; and Block S40': the touchscreen device receives, i.e., senses the touch events that are generated by the mobile TGD.

As indicated above, the TGD may be equipped with a detector system 16, preferably a photodetector. Note that the above steps can be carried out in any order and form the basis of a bidirectional communication. For example, an image is displayed in response to sensing the touch events. Conversely touch events can be generated in response to an image read at the TGD.

Next, many schemes can be contemplated for encoding/decoding on each side of the system's components 10, 20. First, assuming that an image is to be displayed, then flickering code may for instance be used, as known per se. More generally, one or more images can be displayed at the touchscreen panel and decoded at the logic 12. Such images can furthermore be modulated in space (e.g., barcode) and/or in time (e.g., sequence of barcode images). Second, concerning now the touch events, again, many encoding algorithms can be contemplated. Optimal algorithms notably depend on the number of touch-sensitive elements integrated. For instance, on-off keying (i.e., the absence/occurrence of a touch event represents binary logic 0s/1s) can be used when only one TGE is integrated, or used in parallel with several TGEs. More generally, various vocabularies can be designed wherein information words are represented by specific sequences of touch events. Other variants shall be discussed below. This also applies to touch event sequences as discussed earlier, e.g., in reference to step S30.

Among other applications, schemes such as discussed above are particularly advantageous for e-banking applications. Other secure applications can be contemplated, using a similar philosophy.

Computer-Program Product Embodiments

Computer program code required to implement at least parts of the above computerized methods may be implemented in a high-level (e.g., procedural or object-oriented) programming language, or in assembly or machine language if desired; and in any case, the language may be a compiled or interpreted language. Suitable processors include general and special purpose microprocessors. Note that operations that the TGD and/or the touchscreen device (and/or possibly a server or any network host involved) performs may be stored on a computer program product tangibly embodied in a machine-readable storage device for execution by a programmable processor; and method steps of the invention may be performed by one or more programmable processors executing instructions to perform functions of the invention. In all case, the present invention may encompass not only the TGD but a system including this device, augmented with one or more of the following: a touchscreen device, a server and/or any network host, etc.

More generally, the above embodiments may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, flash memory or others.

Final Considerations

Embodiments have been disclosed, which propose devices and method that extends known display-reading approaches for use with touch-sensitive displays. Some of the described embodiments enable efficient bidirectional data communication while not requiring precise alignment or pre-calibration of the two devices. There are various applications that may benefit from such a very short range wireless communication mechanism, for example, communication with secure tokens for authentication purposes (as described above) and more generally the pairing of devices, etc.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

In that respect, many variants are possible. For example, to increase the communication bandwidth when encoding data into touch events, the TGD might make use of multiple TGEs and consider the position of the touches within the encoding/decoding algorithm. Depending on the positioning of the TGEs, it may again be necessary to automatically align the two devices as described before; the same techniques can be used. Additionally, if the touch-sensitive display supports multi-touch (the detection of multiple parallel touch events) this feature might be explored by activating multiple TGEs in parallel. If, for example, eight touch events could be recognized in a single multi-touch event, and a matrix of eight by eight TGEs would be used, 32 bits could be transferred with a single multi-touch thereby increasing data throughput and/or reducing the time of interaction between the paired devices, thus increasing convenience for the user of the devices. As evoked earlier, the TGD might be equipped with a light-sensitive, energy-harvesting (i.e., "solar") panel. The solar panel may be used to charge a battery included or, even, the TGD can be powered directly by the light emitted by the display of the touchscreen device, thereby removing the need for a battery within the TGD. Other energy-harvesting device can be envisioned. Also, the communication between the two devices 10, 20 might be half-duplex or full-duplex.

Next, the touchscreen device might automatically detect the presence of the TGD by detecting a special series of touch events (unlikely to be generated by humans or other unintentional touches), generated by the TGD. Such a series may further be part of a preliminary sequence encoding configuration data, as evoked earlier. The TGD may for example encode an ID that identifies the type of device in cases where multiple variants/models of TGDs exist. The touchscreen device would then adapt its response accordingly (sensing parameters, image displayed, etc.).

The invention claimed is:

1. A mobile touch-generating device, comprising:
   logic;
   a touch-generating system, comprising one or more touch-generating elements, operatively coupled to the logic and configured to generate touch events detectable by a touchscreen, via the elements; and
   a network connectivity device operatively coupled to the logic to establish a secure connection directly with a server via a telecommunication network and receive data directly from the server through an established secure connection; and
   a visualization device included in the touch-generating system and separate from the touchscreen, the visualization device connectable directly to the server via the logic so as to receive secured data directly from the server and to display contents according to the secured data received through the established secure connection.

2. The mobile touch-generating device of claim 1, wherein the touch-generating system comprises at least three touch-generating elements.

3. The mobile touch-generating device of claim 1, wherein the touch-generating system comprises nine touch-generating elements.

4. The mobile touch-generating device of claim 1, wherein the one or more touch-generating elements comprise respective conductive electrodes and the touch-generating system further comprises circuitry coupled to the logic and connected to the electrodes via one or more switches, allowing for closing the circuitry and draining electrical charge from the electrodes.

5. The mobile touch-generating device of claim 1, wherein the network connectivity device are coupled to establish the secure connection with the server by using a network connection enabled by a neighboring device by tethering over the network connection.

6. The mobile touch-generating device of claim 1, wherein the mobile touch-generating device is configured to rest on the touchscreen, with the touch-generating elements in close proximity with the touchscreen.

7. A system comprising:
   logic;
   a touch-generating system, comprising one or more touch-generating elements, operatively coupled to the logic and configured to generate touch events detectable by a touchscreen, via the elements; and
   a network connectivity device operatively coupled to the logic to establish a secure connection directly with a server via a telecommunication network and receive data directly from the server through an established secure connection; and
   a visualization device included in the touch-generating system and separate from the touchscreen, the visualization device connectable directly to the server via the logic so as to receive secured data directly from the server and to display contents according to the secured data received through the established secure connection, wherein the touch-generating system of the mobile touch-generating device is configured to generate touch events; and
   the touchscreen further configured to establish a connection to the telecommunication network, wherein data of touch events detected at the touchscreen is received at the server.

8. The system of claim 7, wherein the mobile touch-generating device is configured such that the mobile touch-generating device can rest on the touchscreen, with the touch-generating elements in close proximity with the touchscreen, and spanning an area smaller than a surface of the touchscreen.

9. The system of claim 7, wherein the server is configured to:
   receive data of touch events detected at the touchscreen;
   select contents in accordance with the received data and send the selected contents through a secure connection established with the mobile touch-generating device for subsequent display at or via the mobile touch-generating device.

10. A method of communication between a mobile touch-generating device, a touchscreen and a server, comprising:
    generating one or more touch events via the mobile touch-generating device, the mobile touch-generating device comprising: logic, a touch-generating system comprising one or more touch-generating elements, operatively coupled to the logic and configured to generate touch events detectable by a touchscreen, via the elements, a network connectivity device operatively coupled to the logic to establish a secure connection directly with a server via a telecommunication network and receive data directly from the server through an established secure connection, and a visualization device included in the mobile touch-generating system and separate from the touchscreen, the visualization device connectable directly to the server via the logic so as to receive secured data directly from the server and to display contents according to the secured data received through the established secure connection;
    detecting the generated touch events at the touchscreen and sending data of touch events via the telecommunication network;
    receiving at the server the data of touch events or related data;
    sending contents selected in accordance with the received data directly to the visualization device through a secure connection established with the mobile touch-generating device; and
    receiving the contents at the mobile touch-generating device and displaying them via the visualization device.

11. The method of claim 10, wherein the touch events are detected via an application running on the touchscreen.

12. The method of claim 11, wherein the touch events are detected by computer program code such as JavaScript code, the computer program code implemented as part of the running application that preferably is a browser displaying a web page through the touchscreen.

13. The method of claim 10, wherein the data of touch events comprise information as to a location of the mobile touch-generating device or the one or more touch-generating elements having generated the touch events, relative to contents displayed via the touchscreen when detecting the touch events.

14. The method of claim 10, wherein the secure connection is established via the network connectivity device, using one of the following:
- a network connection enabled by a neighboring device, preferably by tethering over such a network connection; or
- a separate network connection.

15. The method of claim 10, further comprising receiving configuration data pertaining to a configuration of the mobile touch-generating device, the configuration data indicating an arrangement of the one or more touch-generating elements, and wherein receiving configuration data comprises:
- receiving via the touchscreen a sequence of touch events generated by the mobile touch-generating device; and
- determining the configuration according to the sequence received.

16. A computer program product comprising a non-transitory computer readable storage medium having instructions stored thereon that, when executed by a computer, implemented a method of communication between a mobile touch-generating device, a touchscreen and a server, the method comprising:
- generating one or more touch events via the mobile touch-generating device, the mobile touch-generating device comprising: logic, a touch-generating system comprising one or more touch-generating elements, operatively coupled to the logic and configured to generate touch events detectable by a touchscreen, via the elements, a network connectivity device operatively coupled to the logic to establish a secure connection directly with a server via a telecommunication network and receive data directly from the server through an established secure connection, and a visualization device included in the mobile touch-generating system and separate from the touchscreen, the visualization device connectable directly to the server via the logic so as to receive secured data directly from the server and to display contents according to the secured data received through the established secure connection;
- detecting the generated touch events at the touchscreen and sending data of touch events via the telecommunication network;
- receiving at the server the data of touch events or related data;
- sending contents selected in accordance with the received data directly to the visualization device through a secure connection established with the mobile touch-generating device; and
- receiving the contents at the mobile touch-generating device and displaying them via the visualization device.

17. The computer program product of claim 16, wherein the touch events are detected via an application running on the touchscreen.

18. The computer program product of claim 17, wherein the touch events are detected by computer program code such as JavaScript code, the computer program code implemented as part of the running application that preferably is a browser displaying a web page through the touchscreen.

19. The computer program product of claim 16, wherein the data of touch events comprise information as to a location of the mobile touch-generating device or the one or more touch-generating elements having generated the touch events, relative to contents displayed via the touchscreen when detecting the touch events.

20. The computer program product of claim 16, wherein the secure connection is established via the network connectivity device, using one of the following:
- a network connection enabled by a neighboring device, preferably by tethering over such a network connection; or
- a separate network connection.

21. The computer program product of claim 16, wherein the method further comprises receiving configuration data pertaining to a configuration of the mobile touch-generating device, the configuration data indicating an arrangement of the one or more touch-generating elements, and wherein receiving configuration data comprises:
- receiving via the touchscreen a sequence of touch events generated by the mobile touch-generating device; and
- determining the configuration according to the sequence received.

* * * * *